United States Patent [19]

Youngquist

[11] 4,052,517

[45] Oct. 4, 1977

[54] SHAPED TEXTURED PROTEIN FOOD PRODUCT

[75] Inventor: Rudolph William Youngquist, Cincinnati, Ohio

[73] Assignee: The Procter & Gamble Company, Cincinnati, Ohio

[21] Appl. No.: 638,771

[22] Filed: Dec. 8, 1975

Related U.S. Application Data

[63] Continuation of Ser. No. 506,079, Sept. 16, 1974, abandoned.

[51] Int. Cl.$^2$ .................................................. A23J 1/14
[52] U.S. Cl. .................................. 426/302; 426/104; 426/656; 426/512; 426/802
[58] Field of Search ................... 106/154 R; 426/656, 426/302, 303, 297, 289, 292, 293, 802, 104, 89, 93, 512

[56] References Cited

U.S. PATENT DOCUMENTS

| | | | |
|---|---|---|---|
| 2,174,438 | 9/1939 | Corwin | 106/154 R |
| 3,594,192 | 7/1971 | Mullen | 426/211 |
| 3,662,672 | 5/1972 | Hoer | 426/212 |

OTHER PUBLICATIONS

Processed Plant Protein Foodstuffs, Altschull Academic Press, N. Y., 1958, pp. 410, 411.

*Primary Examiner*—Hiram H. Bernstein
*Attorney, Agent, or Firm*—Rose Ann Dabek; Jerry J. Yetter; Richard C. Witte

[57] ABSTRACT

A shaped protein food product comprising edible textured protein particles bound together by heat-set cottonseed protein isolate.

20 Claims, No Drawings

SHAPED TEXTURED PROTEIN FOOD PRODUCT

CROSS REFERENCE TO RELATED APPLICATION

This application is a continuation of the application of Rudolph William Youngquist, Ser. No. 506,079, filed Sept. 16, 1974 and now abandoned.

BACKGROUND OF THE INVENTION

1. Field of the Invention

The field of this invention relates to textured protein food products, particularly meat analog food products formed from texturized protein.

2. Description of the Prior Art

Heretofore much work has been done to provide satisfactory meat analog food products. Meat analogs, or in other words, simulated meats, are generally formed from texturized protein particles.

A variety of prior art processes are known for "texturizing" vegetable protein, i.e., imparting to vegetable protein the chewy toughness and mouthfeel associated with meat, and assembling the texturized protein into familiar meat forms to provide meat analog products. For example, meat analog products can be made by processes involving fiber spinning or thermal plastic extrusion.

The fiber spinning technique is an adaptation of the spinnerette method of making synthetic textile fibers. In the meat analog adaptation of this method, fibrous textured protein products are prepared from proteins such as soy protein by forming a spinning dope from alkali solublilized protein and extruding the dope through a perforated die (spinnerette) into an acid (isoelectric) precipitating bath. The acidic bath sets the filaments or fibers as they emerge from the spinnerette. Thereafter, the fibers are collected for subsequent processing. The fibers, during the collection process, are usually stretched to orient the molecular structure of the fibers; thereafter, the fibers are assembled in "tows", bundles of individual fibers aligned in parallel fashion. Binding agents, coloring, fat and flavor can be added to the fiber tows and the entire fiber mass shaped to resemble familiar meat products. Details regarding the techniques are disclosed, for example, in U.S. Pat. Nos. 2,682,466, granted June 29, 1954, to Boyer; and 3,482,998, granted Dec. 9, 1969, to Carroll, et al.

the thermal plastic extrusion method of forming textured protein meat analog products is an adaptation of technology involved in making ready-to-eat cereal food products. The thermal plastic extrusion process involves preparing a mixture of protein material, water, flavor and other ingredients and thereafter feeding the mixture into a cooker extruder wherein it is subjected to heat and pressure and subsequently extruding the mixture. The extrudate filament as it enters into a medium of reduced pressure (usually atmospheric) expands to form a fibrous cellular structure. On rehydration, the fibrous filamentary texturized protein product can possess an appearance, a bite and mouth feel comparable to cooked hamburger. Details regarding thermal plastic extrusion techniques for the forming of textured protein meat analogs are disclosed, for example, in U.S. Pat. Nos. 3,488,770 granted Jan. 6, 1970, to Atkinson; and 3,496,858, granted Feb. 24, 1970, to Jenkins. With the use of suitable binders, products similar to hamburger patties, meat balls, meat loaves and meat chunks can be formed. A variety of other processes are known for providing very suitable texturized proteins which approach the texture and appearance of the textured protein of natural meats.

Textured proteins are generally obtained in the form of particles, for example, fiber pieces, fibrous extrudate filaments, or granules. These particles must be bound together to form shaped meat analog products, for example, beef chunk analogs, chicken analogs, hamburger patty analogs and meat loaf analogs. To hold these particles together, a suitable binder is required. To be acceptable, a suitable binder must have at least the following characteristics. It must present a reasonably bland or meat-compatible taste. It must bind effectively. It must heat-set under mild conditions which will not adversely affect the protein particles. It must provide a product with an acceptable meat-like texture and mouthfeed when heat-set.

Heretofore, the really suiable binding material for meat analog products and natural extended meat products such as meat loaves and croquettes have involved the use of egg white. Egg white can be an excellent binding material, but the supply of egg white is limited and the cost is high. Attempts have been made heretofore to replace a portion of the egg white as the binding material is meat analog products. For example, U.S. Pat. No. 3,343,963, granted Sept. 26, 1967, to Kjelson discloses a three component binder system comprising albumen, gluten and particulate defatted oilseed material; and U.S. Pat. No. 3,594,192, granted July 20, 1971, to Mullen, et al., discloses a binder comprising egg white and a modified soy protein.

These binders, however, still require the presence of egg white. A preferred binder would be one derived from an abundant available vegetable source. The prior art does not disclose, however, vegetable materials known to function as really suitable binders for textured protein foods.

Cottonseed protein is a material which is in abundant supply. Heretofore, it was known that cottonseed protein could be solubilized in water in the presence of inorganic salts. (See U.S. Pat. No. 2,194,867, granted Mar. 26, 1940, to Olcott.)

SUMMARY OF THE INVENTION

In summary, it has been found that cottonseed protein isolate solubilized in water in the presence of an edible water soluble salt is an excellent binder for textured protein food products. More particularly, this invention provides a process for forming shaped textured protein food products comprising (1) coating particulate textured protein material with a binder comprising from about 10% to 70% by weight, of a mixture of cottonseed protein isolate and water soluble salt, the weight ratio of cottonseed protein isolate to salt being from about 2:1 to 30:1 and from about 30% to 90%, by weight, water; (2) shaping the coated particulate material into a unitary shaped product; and (3) heating the shaped product to heat-set the binder. In another aspect, this invention provides the novel protein food products formed by this process.

DETAILED DESCRIPTION OF THE INVENTION AND ITS PREFERRED EMBODIMENTS

This invention provides new shaped textured protein food products formed by a process comprising the steps of (1) coating particulate textured protein material with a binder comprising from about 10% to 70%, by weight, of a mixture of cottonseed protein isolate and edible water soluble salt, the weight ratio of cottonseed protein isolate to salt being from about 2:1 to 30:1, and from about 30% to 90%, by weight, water; (2) shaping the coated particulate material into a unitary shaped product; and (3) heating the shaped product to heat-set the binder.

The product of this process is a novel shaped protein food product comprising particulate textured protein particles bound together by heat-set cottonseed protein isolate.

As used herein "particulate textured protein material" means a plurality of edible protein particles which have a hydration capacity of from about 1 to 4 times their weight of water and when hydrated remain particulate (maintain their structural integrity) and have a chewy texture characteristic of meat.

The term "chewy texture" refers to and includes the physical characteristic of the protein material which causes such materials when chewed in the mouth to present the properties of resilience, elasticity and resistance to shear characteristic of meat. This chewy texture is preferably evaluated subjectively by chewing the protein, however, this texture of the protein material can be expressed in shear press values. Suitable textured protein material for use herein includes protein material having a shear press value in the range of 300 to 1500 pounds determined according to the method disclosed in U.S. Pat. No. 3,778,522, granted Dec. 11, 1973, to Strommer.

The term "hydration capacity" as used herein refers to the total amount of water the dry protein material is able to hold and is determined by soaking dry textured protein particles in excess water for 30 minutes and then draining for 5 minutes. The hydration capacity is the weight of water retained per unit weight of the dry protein material.

The term "shaping" as used herein refers to any physical operation such as molding and pressing which causes a plurality of particulate texture protein particles material to be aggregated together as a unit and conform to a particular configuration.

The term "edible water soluble salt" means any edible salt or edible mixture of salts which exhibit sufficient solubility in water to solubilize cottonseed protein. Preferably, the salt will exhibit a solubility greater than 1 gram in 100 grams water at 25° C.

In forming any desirable food products within the scope of this invention, it will be preferred to use particulate texture protein materials which have physical characteristics which meet proposed USDA-FNS specifications for textured meat alternatives set forth in the Federal Register, Vol. 39, p. 11,297, dated Mar. 27, 1974.

Suitable particulate textured protein materials for use herein can consist of from 30% to ;b 100% protein, on a dry weight basis, and from 0% to 70% materials associated with the protein source material or added adjuvant materials. Examples of adjuvant materials are carbohydrates, vitamins, and flavors, etc. Preferably, the protein particles consist of 50% to 100% protein, and most preferably 50% to 80% protein on a dry weight basis.

The size and shape of the particulate textured protein material is not a critical aspect of this invention and can be selected to achieve the product characteristics desired. The particulate protein material is preferably fibrous since this protein material can be formed into very desirable fibrous meat analog food products.

Meat is an example of textured protein material. It is important to note, however, that proteins which are not textured can be texturized to form textured protein. These texturized proteins are preferred for use herein.

Suitable untextured protein which can be texturized to form textured particulate protein materials are available from a variety of sources. The preferred source of such proteins is vegetable protein; however, animal protein can be employed. Examples of suitable animal proteins are casein and egg white. Examples of suitable vegetable protein sources are soybeans, safflower seed, corn, peanuts, wheat, peas, sunflower seed, cottonseed, coconut, rapeseed, sesame seed, leaft proteins, single cell proteins such as yeast, and the like. Generally, if the protein source is a vegetable protein, the protein prior to use is placed in a relatively pure form. Thus, for example, if the protein source is soybeans, the soybeans can be dehulled and solvent extracted, preferably with hexane, to remove the oil therefrom. The resulting oil-free soybean meal contains about 50% protein.

The soybean meal can be processed in known manner to remove carbohydrates and obtain products with higher levels of protein, for exaple, soy protein concentrates containing about 70% protein or soy protein isolates containing about 90% or more protein. In turn, a variety of suitable prior art processes can be employed to convert the soybean meal, concentrate, isolate and other edible protein bearing materials into suitable texturized particulate protein materials.

Suitable methods for converting untextured animal and vegetable protein bearing materials into particulate textured proteins are disclosed, for example, in the following U.S. Pat. Nos. 2,682,466, granted June 29, 1954, to Boyer; 3,142,571; granted July 28, 1964, to Kitchel; 3,488,770 granted Jan. 6, 1970, to Atkinson; 3,498,794 granted Mar. 3, 1970 to Calvert, et al., 3,759,715 granted Sept. 18, 1973, to Loepiktie, et al.; 3,778,5222 granted Dec. 11, 1973, to Strommer; 3,794,731 granted Feb. 26, 1974, to Dannert, et al.; 3,814,823 granted June 4, 1974 to Yang, et al.; and commonly assigned U.S. Pat. application Ser. No. 248,581, filed Apr. 28, 1972, now U.S. Pat. No. 3,840,679, granted Oct. 8, 1974, to Liepa, et al.; all said patents being incorporated herein by reference.

The most suitable particulate textured proteins are protein fibers with a cross-section of from about 20 to about 500 microns. The fibers can be in form of a fiber bundle (tow) comprised of numerous fibrous filaments having a substantially larger cross-section. Especially suitable particulate proteins are fibrous cellular texturized proteins formed by expansion, for example, texturized proteins formed by extrusion as mentioned hereinbefore.

It has been found that a composition comprising from about 1 to 30 parts, preferably 1 to 20 parts, cottonseed protein isolate and 1 part edible water soluble salt which can solubilize cottonseed protein isolate when moistened with water is very effective for binding together particular textured proteins to form desirable shaped textured protein food products.

The cottonseed protein isolate employed should be isolated from cottonseed under mild conditions such that the protein is substantially undenatured. A variety of suitable methods for isolating cottonseed protein are known. For example, the method disclosed in U.S. Pat. No. 2,194,867, issued March 26, 1940, to Olcott is suitable. Another convenient method involves slurrying defatted cottonseed flakes in water having a pH of from about 9 to 10 to dissolve the protein, separating the water containing dissolved protein and adjusting the pH of the water to 6.8 to 7.0 to precipitate the protein. If desired, the precipitated cottonseed protein can be dried, for example, by freeze-drying, and stored for later use.

Since the isoelectric pH of the cottonseed protein isolate employed is about 6.8 to 7.0, the cottonseed protein is substantially insoluble in water (pH 7.0) and is substantially insoluble in the acceptable meat flavor pH range of 5.5 to 7.5. (pH values outside this range present progressively less acceptable flavor). The cottonseed protein can be solubilized at pH 5.5 to 7.5, however, in the presence of a variety of edible water soluble salts.

Examples of edible water soluble salts are sodium chloride, potassium chloride, calcium chloride, ferrous chloride, ferric chloride, magnesium chloride, sodium carbonate, potassium carbonate, sodium sulfate, potassium sulfate, aluminum sulfate, sodium phosphates, potassium phosphates, sodium acetate, potassium acetate, potassium tartrate, potassium citrate, potassium lactate, and aluminum lactate. It can often be advantageous to use mixtures of salts to achieve a desired nutrition or flavor effect.

The preferred edible salts which solbulize cottonseed protein include sodium, potassium and calcium chloride, sulfate and phosphate. Of these salts, potassium and sodium chloride are very preferred, and calcium chloride is most preferred for use herein. It has been discovered that salt solubilized cottonseed protein isolate functions as a very effective binder in protein food products.

The binder is generally prepared for use by adding sufficient water to the mixture of cottonseed protein and salt to form a moist tacky binder composition. This binder composition is generally from 30% to 90%, by weight, water and preferably from 50% to 80%, by weight, water.

A variety of known techniques can be employed to coat the particulate textured protein material with the binder. For example, the binder can be sprayed or metered onto the textured protein particles, or the binder and particles can be combined together and mixed, for example, by tumbling the combination in an inclined rotating drum.

Preferably, the particulate textured protein material to be coated with the binder is hydrated with 1 to 3 times its dry weight water. While it is preferred that both the particulate protein and the binder be moistened prior to mixing, the materials can be mixed together dry prior to adding the required water.

The binder is employed in an amount sufficient to provide a food product bound together to the desired extent after a heat-setting step. The particular amount of binder most suitably employed will, of necessity, vary somewhat with the particular food product formulated. In general, the ratio (dry weight basis) of binder to particulate protein will be in the range of from about 2:1 to 1:10, preferably from about 1:1 to 1:8, and more preferably from about 1:2 to 1:8. Real or analog meat patties, meat loaves, and meat balls require a lesser degree of binding, and hence less binder can be employed; whereas analog meat chunks require a higher degree of binding, and hence more binder, to achieve the toughness associated with the mouthfeel of beef chunks.

The textured particulate protein material coated with a suitable amount of binder is then shaped into unitary food products, for example, real or analog meat patties, meat loaves, meat balls or meat chunks or slabs. The shaping can be done by hand, or suitable molds, forms, presses or converging conveyer belts can be employed. Preferably, the products are shaped to resemble familiar meat products, for example, hamburger patties, meat balls, or beef chunks.

These moist shaped unitary food products comprised of particulate proteins are then heat-set to complete the binding process. Heat-setting denatures the cottonseed protein such that it becomes insoluble firmly binding the textured protein particles together. In general, temperatures within the range of from 120° to 450° F, preferably 150° to 400° F, will suitably heat-set the binder. The time necessary to provide good heat-setting at a particular temperature will vary significantly depending on the temperature and thickness of the shaped protein product. A relatively thin patty can generally heat-set in 2 to 30 minutes, whereas a thick product such as a meat loaf can require several hours.

Suitable heat-setting temperatures are attained in a variety of operations; for example, baking, frying, or microwaving the shaped product will heat-set the binder satisfactorily.

The resulting unitary shaped food product is a novel protein food product comprising a plurality of textured protein particles bound together by heat-set cottonseed protein isolate. On heat-setting, the solubilizing salt has performed its protein solubilizing and is no longer considered an essential product component. The product can be frozen or dehydrated and stored for later use. The dehydrated product can be re-hydrated to provide very suitable food products.

The food products of this invention will often contain additional ingredients to impart desirable taste and appearance characteristics to the product. The binder can often be a desirable carrier for these ingredients.

In this regard, the binder composition can often desirably include, in addition to the above-described binder ingredients, other edible ingredients such as flavoring agents, coloring agents, oils and fats and the like. For example, various meat flavors which are available commercially can be added. Representative thereof are bouillon cubes having chicken, beef and other meat flavors. Synthetic ham, bacon and sausage flavors may also be used. Additionally, various spices and salts can be employed to provide further flavor. The coloring agents may be dyes or other coloring materials which can simulate the color of meat.

Vegetable oils and animal fats and oils can also be added to the binder mixture. Representative thereof are soybean oil, cottonseed oil, corn oil, coconut oil, palm kernel oil, olive oil, peanut oil, sesame seed oil, safflower oil, tallow, lard, chicken fat, butter, cod-liver oil and the like. The oils and fats may be partially or fully hydrogenated.

A binder composition containing fat and flavor, for example, can be emulsified and the emulsion mixed with the particulate textured protein material to provide an even distribution of the binder, fat and flavoring agents. If desirable, an edible emulsifier can be employed to aid formation of such an emulsion. Representative of such emulsifiers are: Mono- and diglycerides of fatty acids, such as monostearin, monopalmitin, monoolein, and dipalmitin; higher fatty acid esters of sugars, such as sucrose partial palmitate and sucrose partial oleate; phosphoric and sulfuric acid esters, such as dodecyl glyceryl ether sulfates and monostearin phosphate; partial esters of glycerol and both higher and lower fatty acids, such as glyceryl lactopalmitate; and polyoxyalkylene ethers of fatty esters of polyhydric alcohols, such as the polyoxyethylene ethers of sorbitan monostearate and sorbitan distearate.

While the amount of the additional ingredients in proportion to the binder can vary over a wide range, the amount of these additional ingredients should not so dilute the binder such that it becomes ineffective.

The following examples illustrate specifically several embodiments of the invention disclosed herein.

EXAMPLE I

A particulate textured soy protein material was obtained by extruding a commercially available soy concentrate (containing about 70% protein) in a known manner as follows:

Sixty-five parts soy concentrate were mixed with 35 parts water, and the pH of the mixture was adjusted to 5.8 with HCl.

The resulting composition was extruded in a Brabender Model 2503 extruder equipped with a medium compression (2:1) screw and an extrusion die containing a 3/16 inch diameter orifice. The extruder was maintained at a temperature of 175° C at the extrusion die and the front end of the barrel. The screw was rotated at a rate of 200 rpm.

The extruded product expanded rapidly on emerging from the die while releasing steam. The resulting product was a fibrous protein filament. The filament was chopped into pieces having a length of about one inch. The fibrous protein filament product was dried in an oven at 60° C for 7 hours to obtain a storage stable product. When the dry product is added to water, it absorbs approximately three times its dry weight of water. The resulting hydrated product resembles loose cooked ground hamburger meat in appearance and texture, and is characterized as a hamburger analog.

A binder was formed by mixing 4.0 parts cottonseed protein isolate, 0.6 parts calcium chloride, and 10 parts water. This mixture was stirred until the cottonseed protein was solubilized. The resulting binder is a moist tacky material.

Fourteen and six-tenths parts of this binder were added to 31.4 parts of the fully hydrated hamburger analog and mixed together, coating the analog particles with the binder. Fifty grams of this mixture were pressed in a hamburger patty mold, and shaped into a circular patty having a diameter of 3¾ inches and a thickness of ⅜ inch.

The shaped patty was then placed in a microwave oven and microwaved for three minutes (providing a temperature of about 200° F) to heat-set the binder.

The extruded protein particles were bound together providing an all vegetable protein food product which closely resembled a hamburger patty in appearance, handling characteristics and mouthfeel. The product is characterized as a hamburger patty analog. The patty had a suitably bland meat compatible taste so that it can be flavored appropriately.

EXAMPLE II

When in Example I, sodium chloride, potassium chloride, or mixtures thereof are used instead of calcium chloride, similar results are obtained.

EXAMPLE III

A flavored hamburger patty analog was formed by combining the following ingredients:

| | |
|---|---|
| Dry soy protein extrudate particles (Example I) | 240 parts |
| Caramel color | 2 parts |
| Flavor ingredients | 134 parts |
| Liquid soybean oil | 100 parts |
| Cottonseed protein isolate | 100 parts |
| Calcium chloride | 12 parts |
| Water | 580 parts |

The ingredients were combined as follows: Soybean oil and flavor ingredients were mixed together. This mixture was then added with mixing to the soy protein extrudate (hamburger analog). Four hundred-twenty parts of water were added to this mixture. This mixture was allowed to stand until the analog become hydrated.

A binder was formed by mixing together the cottonseed protein isolate, calcium chloride and 160 parts water. Mixing was continued until the cottonseed protein was substantially solubilized.

This binder was combined with the hydrated analog and mixed to coat the particles with the binder. This mixture was then formed into circular patty shapes having a diameter of 3 inches and a thickness of ⅜ inch by tamping a 50 gram portion into a mold. These patties were then placed in a microwave oven for three minutes and microwaved (providing a temperature of about 200° F) to heat-set the binder.

The extruded protein particles were bound together providing an all vegetable protein food product which closely resembled a hamburger patty in appearance, taste, and mouthfeel. It is characterized as a hamburger patty analog.

This hamburger patty analog can be dehydrated to provide a storage stable product. The dehydrated product can be rehydrated for use when desired.

EXAMPLE IV

When in Example II, 100 parts of hamburger meat are combined with hydrated analog, the resulting product is a hamburger patty analog which presents improved flavor.

EXAMPLE V

When in Example II, the shaped patties are fried at 300° F for 1½ minutes on each side to heat-set the shaped patties, a very desirable heat-set hamburger patty analog product is obtained.

EXAMPLE VI

A particulate textured protein material was formed by subjecting a coherent workable protein dough to nonturbulent stretching and heat in a manner disclosed in U.S. Pat. No. 3,814,823 as follows:

A dry protein mix having the following formulation was formed.

| Ingredient | Amount | % by Weight of the Dry Protein Mix |
|---|---|---|
| Wheat gluten | 31 g. | 62 |
| Soybean oil (I.V. 107) | 14 g. | 28 |
| Egg white solids | 1.8 g. | 3.6 |
| Beef bouillon flavoring | 2.1 g. | 4.2 |
| Coloring and other minors | 1.1 | 2.2 |

The dry ingredients were mixed with 50 grams of water (which corresponds to 50% by weight water and 50% by weight dry protein mix) in a Hobart VCM mixer for approximately 2 minutes at a temperature of 100° F. The mixture was then extruded through a Brabender cooker/extruder Model 250. The extruder was heated to a temperature of 155° F and the extrusion orifice comprised a hollow truncated cone having a circular cross section. The cone was of a continually decreasing diameter and at its widest diameter was ⅝ inches, and at its narrowest diameter was 3/16 inches. Because of the construction of the extruder outlet tube, no back flowing or turbulence was noted and therefore the Reynolds number never exceeded 2000. Because of the construction of the extruder, the mixture was simultaneously subjected to stretching and heat-setting. The amount of linear expansion was not measured precisely but estimated at about 150%.

The resulting product was ground in a standard meat grinder to form a particulate protein material of a size especially suitable for forming meat patties.

A binder was formed in accordance with this invention by mixing together the following ingredients:

| | | |
|---|---|---|
| 20 g. | Cottonseed protein isolate | |
| 50 g. | Water | |
| 2.4 g. | CaCl$_2$ | |

The texturized protein particles and the binder were placed in a bowl and mixed together until the particles were coated with the binder. Fifty grams of this mixture were pressed into a mold and shaped into a circular patty having a diameter of 3⅜ inches and a thickness of ⅜.

The shaped patty was then placed in a microwave oven and microwaved for three minutes (providing a temperature of about 200° F) to heat-set the binder. The resulting product closely resembled a hamburger patty in appearance, handling characteristics and mouthfeel.

EXAMPLE VII

A particulate textured protein material was formed in a manner disclosed in U.S. patent application Ser. No. 248,581, now U.S. Pat. No. 3,840,679 as follows:

The following mixture was prepared by mixing for 5 minutes at 60 rpm in a Hobart A-200 mixer equipped with a dough hook:

| Ingredient | Amount (% by Weight) |
|---|---|
| Soy protein isolate | 41.0 |
| Egg white solids | 27.0 |
| Liquid shortening | 1.0 |
| Coloring | 0.5 |
| Beef flavor | 2.0 |
| Water | 28.5 |
| TOTAL | 100.0 |

This mixture was passed through a noodle extruder to provide intense mixing of the ingredients. The strands emerging from the die were homogeneous and has a circular cross section of approximately 5/16 inch diameter. The strands were cut into approximately ⅜ inch long pellets by means of a rotating knife cutting at the surface of the die.

The pellets were fed into a 3-roll mill through a hopper positioned between rolls No. 1 and No. 2. The roll speed was adjusted so that roll No. 2 rotated about 4% faster (approximately 3 rpm) than roll No. 1, and roll No. 3 rotated about 4% faster than roll No. 2. Roll temperatures were 75° F. Sheeting of the protein pellets to form a coherent workable protein dough sheet resulted; the sheet was transferred in sequence to roll No. 2 and roll No. 3. The distances between the rolls were adjusted to produce a sheet of 0.006 inch thickness. The sheet was removed from roll No. 3 by means of a doctor blade which is angularly disposed with respect to roll No. 3. The angle between the surface of the blade and an imaginary plane, tanget to roll No. 3 and passing through the blade edge-roll contact line, was 113°. A brown creped sheet resulted consisting of numerous tiny, parallel folds approximately 0.033 inch high and 0.040 inch apart, which resembled a single layer of parallel fibers fused together. The creped sheet was pulled away from the blade by means of a conveyor.

The creped protein sheet was conveyed to a rotary cutter equipped with six blades and operated at about 75 rpm. Cuts were made across the width of the creped sheet and parallel to the tiny folds in the crepe, producing strands 1/16 to ⅛ inch wide and about 12 inches long.

The following mixture was prepared for use as an edible binder:

| Ingredient | Parts |
|---|---|
| Cottonseed protein isolate | 8.00 |
| Liquid soybean oil | 10.00 |
| CaCl$_2$ | 1.00 |
| Coloring | .50 |
| Beef flavor | 4.00 |
| Water | 62.00 |
| TOTAL | 85.50 |

The binder was prepared for use by mixing ingredients in a commercial blender for 10 minutes. The mixture was homogenous, brown in color, and had a tacky consistency.

The protein strands were aggregated in parallel alignment and coated with the binder.

The coating operation was performed in the following continuous sequence:

a. a thin layer of binder was placed on a moving conveyor belt;

b. a layer of substantially parallel protein strands was deposited on the layer of binder;

c. a thin layer of binder was deposited on top of the strands. The binder to fiber ratio was 1:1.

The resulting layer consisting of protein strands and binder was transferred by the conveyor to the bottom belt of a continuous cooker-conveyor consisting of two moving, heated, converging stainless steel belts. The temperatures of the belts were 230° F for the top belt and 240° F for the bottom belt. The cooker conveyor was adjusted to compress and shape the material into a slab having a thickness of about ⅛ inch; residence time in the cooker-conveyor was 45 minutes. The product emerging from the cooker-conveyor had the appearance of a ⅛ inch thick slab of cooked beef. Examination of the product showed a fibrous, meat-like texture; eating quality was fibrous and similar to that of cooked beef.

All parts and percentages herein are on a weight basis, unless specified otherwise.

What is claimed is:

1. A process for forming textured shaped protein food products comprising a. coating particulate textured protein material with a binder comprising from about 10% to 70%, by weight, of a mixture of cottonseed protein isolate and an edible water soluble salt, the weight ratio of cottonseed protein isolate to salt being from about 1:1 to 30:1, and from about 30% to 90%, by weight, water;

b. shaping the coated particulate material into a unitary shaped product; and c. heating the shaped product to heat-set the binder.

2. The process of claim 1 wherein the weight ratio of cottonseed protein isolate to salt is from about 1:1 to 1:20.

3. The process of claim 1 wherein the edible water soluble salt is selected from the group consisting of potassium, sodium, and calcium, chloride, sulfate and phosphate salts.

4. The process of claim 2 wherein the edible water soluble salt is selected from the group consisting of potassium chloride, sodium chloride, and calcium chloride.

5. The process of claim 2 wherein the particulate textured protein material is coated with an amount of binder providing a ratio of binder to particulate textured protein material of from about 2:1 to 1:10 on a dry weight basis.

6. The process of claim 5 wherein the shaped protein product is heated to a temperature of from 120° to 450° F to heat-set the binder.

7. The process of claim 5 wherein the particulate textured protein material is hydrated with from 1 to 3 times its dry weight of water.

8. The process of claim 5 wherein the textured protein is texturized vegetable protein.

9. The process of claim 8 wherein the textured protein is fibrous texturized vegetable protein.

10. The process of claim 9 wherein the vegetable protein is soybean protein.

11. The process of claim 10 wherein the salt is calcium chloride.

12. The process of claim 11 wherein the temperature is from about 140° to 400° F.

13. A shaped protein food product comprising edible textured protein particles bound together by a heat-set binder comprising from about 10% to 70%, by weight, of a mixture of cottonseed protein isolate and an edible water soluble salt, the weight ratio of cottonseed protein isolate to salt being from about 1:1 to 30:1, and from about 30% to 90%, by weight, water.

14. The product of claim 13 wherein the textured protein is texturized vegetable protein.

15. The product of claim 14 wherein the textured protein is fibrous texturized vegetable protein.

16. The product of claim 15 wherein the vegetable protein is soybean protein.

17. A protein food product comprising edible textured protein particles and a mixture of a cottonseed protein isolate and an edible salt, said salt exhibiting a solubility greater than 1 gram in 100 grams of water at 25° C, the weight ratio of cottonseed protein isolate to salt being from about 1:1 to 30:1.

18. The product of claim 17 wherein the textured protein is texturized vegetable protein.

19. The product of claim 18 wherein the textured protein is fibrous texturized vegetable protein.

20. The product of claim 19 wherein the vegetable protein is soybean protein.

* * * * *